(12) United States Patent  (10) Patent No.: US 8,478,105 B2
Mikami  (45) Date of Patent: Jul. 2, 2013

(54) MEDIA PLAYER AND CONTENT ID DETERMINATION METHOD

(75) Inventor: Hiroshi Mikami, Tokyo (JP)

(73) Assignees: Sony Corporation, Tokyio (JP); Sony Computer Entertainment Inc., Tokyo (JP)

( * ) Notice: Subject to any disclaimer, the term of this patent is extended or adjusted under 35 U.S.C. 154(b) by 308 days.

(21) Appl. No.: 12/845,280

(22) Filed: Jul. 28, 2010

(65) Prior Publication Data

US 2011/0075996 A1  Mar. 31, 2011

(30) Foreign Application Priority Data

Sep. 30, 2009  (JP) .................................. 2009-226892

(51) Int. Cl.
*H04N 9/80* (2006.01)
*H04N 5/78* (2006.01)

(52) U.S. Cl.
USPC .......................................... 386/239; 386/314

(58) Field of Classification Search
None
See application file for complete search history.

(56) References Cited

U.S. PATENT DOCUMENTS

2005/0203992 A1* 9/2005 Tanaka et al. ................. 709/203

FOREIGN PATENT DOCUMENTS

| JP | 2003-323181 | 11/2003 |
| JP | 2007-72727 | 3/2007 |
| JP | 4195084 | 10/2008 |

OTHER PUBLICATIONS

Decision of Refusal dated Mar. 13, 2012, from corresponding Japanese Application No. 2009-226892.
Notification of Reason(s) for Refusal dated Jul. 12, 2011, from corresponding Japanese Application No. 2009-226892.

* cited by examiner

*Primary Examiner* — William C Vaughn, Jr.
*Assistant Examiner* — Asher Khan
(74) *Attorney, Agent, or Firm* — Katten Muchin Rosenman LLP

(57) ABSTRACT

A media player according to an embodiment includes: a data retriever configured to retrieve, from data recorded on a medium from which a content is run, data including an address that indicates a recording position on the medium of the content provided by the medium; and an ID determination unit configured to determine an ID for identifying the provided content in accordance with the retrieved data in order to acquire, from an external device that stores information related to the content, the information associated with the ID and related to the provided content, by communicating the ID to the external device.

6 Claims, 8 Drawing Sheets

FIG. 5

| CONTENT KEY | TITLE INFORMATION | CHAPTER INFORMATION | SERIES PRODUCT | RECOMMENDED PRODUCT | PERFORMER INFORMATION |
|---|---|---|---|---|---|
| 0x11223344 | REAL DATA | REAL DATA | 0xaabbccdd | CONTENT KEY IN ONLINE SHOPPING SITE SERVER | CONTENT KEY IN ONLINE ENCYCLOPEDIA SERVER |
| 0xaabbccdd | REAL DATA | REAL DATA | 0x11223344 | CONTENT KEY IN ONLINE SHOPPING SITE SERVER | CONTENT KEY IN ONLINE ENCYCLOPEDIA SERVER |

54

MEDIA PLAYER AND CONTENT ID DETERMINATION METHOD

BACKGROUND OF THE INVENTION

1. Field of the Invention

The present invention relates to a data processing technology and, more particularly, to a media player and a content ID determination method executed by the media player.

2. Description of the Related Art

A media player is proposed adapted to download title information corresponding to a medium from which a content is run from a remote database on the Internet (see, for example, patent document No. 1).

[patent document No. 1] Japanese Patent 4195084

Typically, when a media player acquires, from an external information provider device, information related to a content that is run from a medium, the player communicates an ID for identifying the content to the information provider device. The discussion in the above-mentioned patent document No. 1 assumes that the TOC data that represent an ID is recorded in a medium. However, an ID may not be explicitly recorded in a medium.

SUMMARY OF THE INVENTION

The present invention addresses this background and a purpose thereof is to provide a technology whereby an ID of a content is determined from the data recorded in a medium even if the ID is not explicitly set.

The media player addressing the aforementioned problem comprises: a data retriever configured to retrieve, from data recorded on a medium from which a content is run, data including an address that indicates a recording position on the medium of the content provided by the medium; an ID determination unit configured to determine an ID for identifying the provided content in accordance with the retrieved data; and a related information acquisition unit configured to acquire, from an external device that stores information related to the content on the medium, the information associated with the ID and related to the provided content, by communicating the ID to the external device.

Another embodiment of the present invention relates to a content ID determination method. The content ID determination method is executed by a media player and comprises: retrieving, from data recorded on a medium from which a content is run, data including an address that indicates a recording position on the medium of the content provided by the medium; and determining an ID for identifying the provided content in accordance with the retrieved data in order to acquire, from an external device that stores information related to the content on the medium, the information associated with the ID and related to the provided content, by communicating the ID to the external device.

Optional combinations of the aforementioned constituting elements, and implementations of the invention in the form of apparatuses, methods, systems, programs, and recording mediums storing programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 schematically shows the configuration of a related information table;

DETAILED DESCRIPTION OF THE INVENTION

Figure 1:
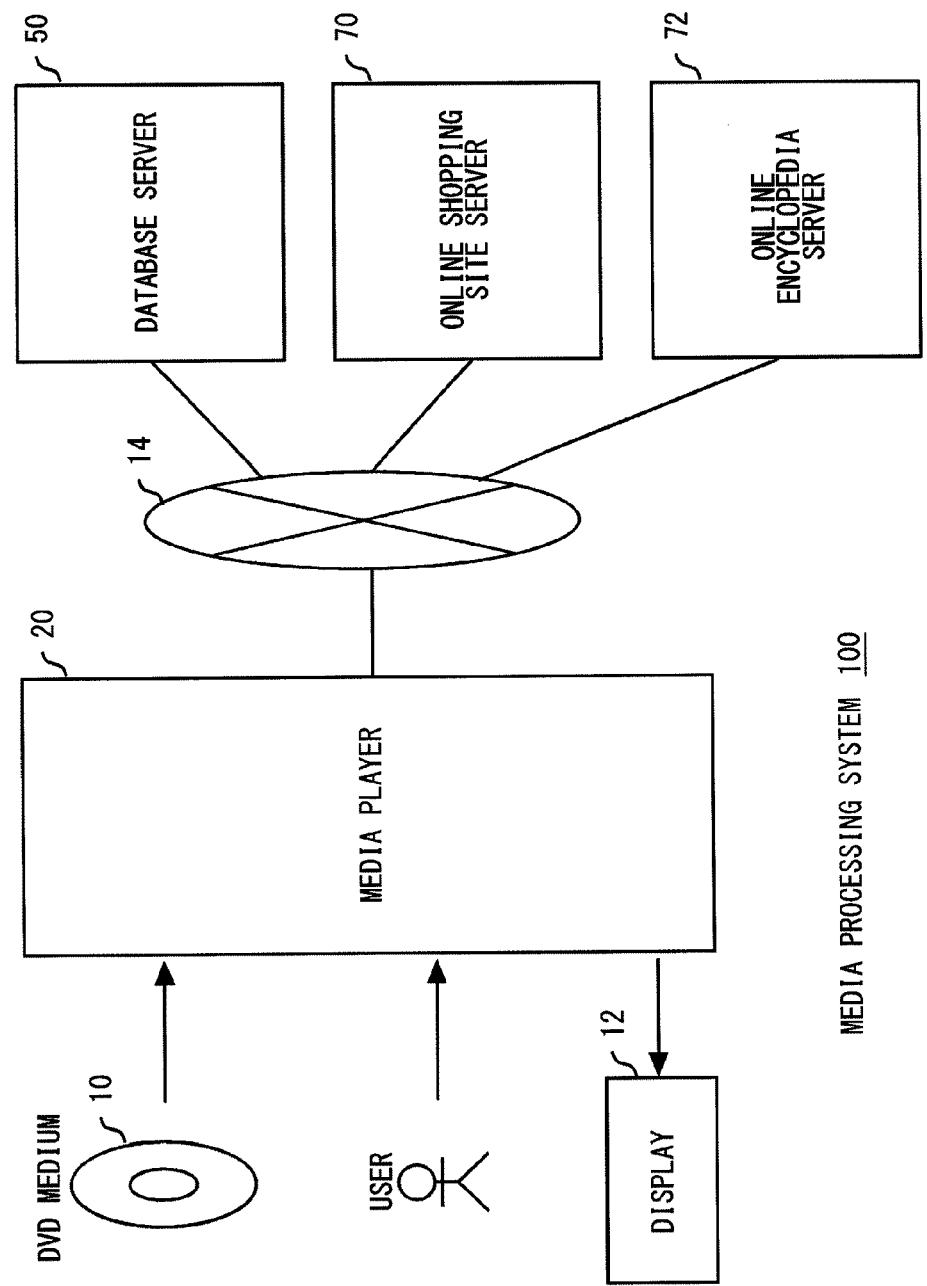
FIG. 1 shows the configuration of a media processing system according to an embodiment of the present invention.

The invention will now be described by reference to the preferred embodiments. This does not intend to limit the scope of the present invention, but to exemplify the invention.

A summary of the present invention will be given before describing the invention in specific detail.

Some media players capable of reading data recorded in a medium and providing a content such as images and music to users acquire information related to the content from an external database server and deliver the related information to users concurrently with providing the content. For example, some CD players acquire related information such as a title name, duration of play, etc. of a music tune from an external database server and display the information when running a CD media.

A DVD package or a BD package stores various attribute information on contents (hereinafter, also referred to as "attribute objects"), e.g., a large number of titles, chapters, menus, etc. in a single medium. When a media player should acquire related information for each attribute object, the related information that the media player should acquire would amount to a large number or a large data volume as a whole. Further, associated with increased variety of media player functions, a media player running a content is required to acquire various related information from an external source and deliver the information to a user.

In light of the fact that the volume of related information that a media player should acquire from an external source is increasing, the method of acquiring the related information at a time when running a content is not favorable because a great deal of network and media player resources are occupied. In this embodiment, there is proposed an information acquisition technology for a media player that should acquire a large volume of related information as a whole when running a content, and an information delivery technology for the media player.

The media player according to the embodiment generates an ID (hereinafter, also referred to as "content ID") for identifying a content based on content data. The player then acquires, from a database server, key information (hereinafter, also referred to as "content key") for accessing the information related to the content. When the information related to the content becomes necessary according to the situation of running the content or the user operation, the related information is acquired from the database server using the content key as the need arises.

This allows the media player to acquire only the related information as needed at a given point of time, even if the information related to the content is voluminous as a whole.

As a result, the amount of network and media player resources occupied is reduced.

A content key is data optimized for the format adapted for the database server, i.e., the Data Base Management System (DBMS) software installed in the database server. In the case of this embodiment, a content key comprises 4-byte data. Meanwhile, a content ID is of a format that depends on a medium and comprises data determined by data recorded in a medium, i.e., content data. In the case of this embodiment, a content ID comprises 60-byte data. In other words, a content ID is not of a format adapted for a database server. The media player acquires a content key of a format adapted for a database server and uses the content key to acquire the related information.

FIG. 1 shows the configuration of a media processing system according to the embodiment. The media processing system 100 comprises a media player 20, a database server 50, an online shopping site server 70, and an online encyclopedia server 72. These devices are connected to each other via a communication network 14 that includes a publicly known communication means such as LAN, WAN, or Internet.

A DVD medium 10 is a medium that conforms to the DVD-video standard and stores image data compressed according to MPEG-2. The media player 20 reads the image data recorded in the DVD media 10 and expands and reproduces (hereinafter, also referred to as "runs") the image data content (hereinafter, also referred to as "content"), and displays the result of running on a display 12. The player 20 receives from the user various operations such as selection of a title, chapter, menu, etc., execution and halt of playback, etc., and performs a process associated with the operation. In addition to DVD media, the media player 20 may be adapted to read various recording media such as CD media, BD media, etc. and run the content accordingly.

The database server 50, the online shopping site server 70, and the online encyclopedia server 72 deliver the information related to the content run by the media player 20 to the media player 20. The database server 50 stores the information related to the content that may be run by the media player 20. In this embodiment, information on titles included in a content and information on chapters of the titles are maintained in the server as the information related to the content by associating the information with the content key optimized for the server.

The online shopping site server 70 is a database server for a website that provides the service of selling various contents online. In this embodiment, the server 70 is assumed to store information on products other than the desired product that should be recommended for purchase to the viewer of the content, as the information related to the content, associating the information on other products with the content key optimized for the server 70. The online encyclopedia server 72 is a database server for a web site that provides online encyclopedia service. In this embodiment, the server 72 is assumed to store information on performers performing in a content, as the information related to the content, associating the information on performers with the content key optimized for the server 72.

Figure 2:
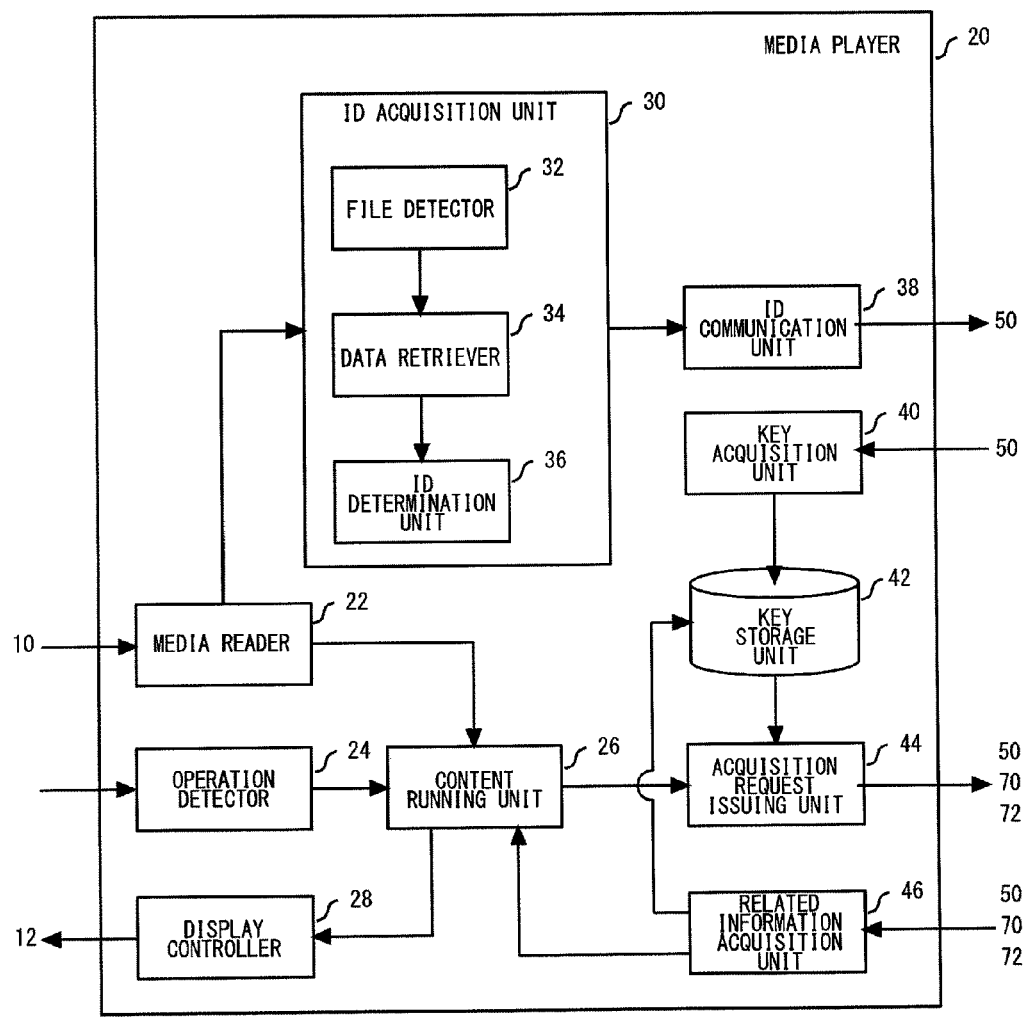
FIG. 2 is a block diagram showing the functional configuration of the media player of FIG. 1.

FIG. 2 is a block diagram showing the functional configuration of the media player 20 of FIG. 1. The blocks shown in the block diagram of this application are implemented in hardware elements such as a CPU of a computer, a memory, etc. or mechanical devices, and are implemented in software such as a computer program, etc. FIG. 2 depicts functional blocks implemented by the cooperation of hardware and software. Therefore, it will be obvious to those skilled in the art that the functional blocks may be implemented in a variety of manners by combinations of hardware and software. For example, some functional blocks may be implemented as software stored in the memory of the media player 20 and executed by the processor. Other blocks may be implemented in hardware such as an electronic circuit.

The media player 20 comprises a media reader 22, an operation detector 24, a content running unit 26, a display controller 28, an ID acquisition unit 30, an ID communication unit 38, a key acquisition unit 40, a key storage unit 42, an acquisition request issuing unit 44, and a related information acquisition unit 46. The key storage unit 42 is a storage area that stores a content key for acquiring the information related to a content from the database server 50, the online shopping site server 70, or the online encyclopedia server 72.

The media reader 22 reads image data recorded on the DVD medium 10 into the memory of the media player 20. The operation detector 24 detects the operation directed to the running of the content via the input device (not shown). The display controller 28 causes the result of running the content by the content running unit 26 on the display 12. When the result of running the content is displayed, the information related to the content and acquired from an external source is also displayed as necessary.

The content running unit 26 runs the content on the DVD medium 10 by expanding and reproducing the image data read by the player. The unit runs the content on the DVD medium 10 in accordance with the user operation detected by the operation detector 24. Further, when any information related to the content becomes necessary while the content is being run, the content running unit 26 requests the acquisition request issuing unit 44 to acquire the necessary related information and receives the acquired related information from the related information acquisition unit 46. In other words, the information related to the content is not acquired at a time. Instead, only the related information that becomes necessary as the content is run is acquired as the need arises.

The ID acquisition unit 30 acquires the content ID of the DVD medium 10 as determined according to the data recorded in the DVD medium 10. The ID acquisition unit 30 includes a file detector 32, a data retriever 34, and an ID determination unit 36.

The file detector 32 detects "VIDEO_TS.IFO" for controlling the overall behavior of the DVD medium 10 and "VTS_xx_0.IFO" for controlling the behavior of the plurality of title sets, from the data files recorded in the DVD medium 10 (xx denotes a 0-padded natural number). "VTS_xx_0.IFO" detected according to the embodiment comprises two files including "VTS_01_0.IFO" for controlling the first title set and "VTS_yy_0.IFO" (yy denotes the ID of the last title set) for controlling the last title set. Hereinafter, "VIDEO_TS.IFO" and "VTS_xx_0.IFO" will be generically referred to as "DVD control files".

The data retriever 34 retrieves, as the data subject to conversion, a predetermined length of data, which is part of the data recorded in the file, from the head of the file from each of the DVD control files detected by the file detector 32.

The length of the data subject to conversion and retrieved from "VIDEO_TS.IFO" is determined so as to include a plurality of attribute information items related to the content on the DVD medium 10 and, more specifically, the information indicating the position (hereinafter, also referred to as "address") on the DVD medium 10 where each of a plurality of title sets is recorded. In other words, the data subject to conversion and retrieved from "VIDEO_TS.IFO" includes various addresses recorded as TT_SRPT (TABLE OF TITLES), VMGM_PGCI_UT (MENU PROGRAM CHAIN TABLE), VMGM_C_ADT (MENU CELL ADDRESS TABLE), VMGM_VOBU_ADMAP (MENU VOBU ADDRESS MAP), etc.

The length of the data subject to conversion and retrieved from "VTS_xx_0.IFO" is determined so as to include a plurality of attribute information items related to the title sets, e.g., addresses on the DVD medium 10 of the menus and image data. In other words, the data subject to conversion and retrieved from "VTS_xx_0.IFO" includes various addresses recorded as VTS_TMAPT (TIME MAP TABLE), VTSM_C_ADT (MENU CELL ADDRESS TABLE), VTSM_VOBU_ADMAP (MENU_VIDEO_OBJECT_UNIT_ADDRESS_MAP), VTS_C_ADT (CELL_ADDRESS_TABLE), VTS_VOBU_ADMAP (VIDEO_OBJECT_UNIT_ADDRESS_MAP), etc.

The ID determination unit 36 passes the data subject to conversion and retrieved from each DVD control file into a predefined Hash function, acquires a fixed-length Hash value, and determines the data obtained by combining the Hash values of the respective data subject to conversion as the content ID. More specifically, the ID determination unit 36 passes the data subject to conversion and retrieved from the three DVD control files into a Secure Hash Algorithm-1 (SHA-1) function to acquire a 20-byte Hash value for the respective data subject to conversion. The 60-byte data resulting from combining the Hash values of the three items of data subject to conversion as the content ID.

An explanation will now be given of why the ID acquisition unit 30 is capable of determining an ID uniquely identifying the content on the DVD medium 10. Moving image compression algorithms like MPEG-2 employs inter-frame prediction and motion compensation using motion vectors to increase the compression efficiency. For this reason, the compressed data for a given content is of a different size from that of the compressed data of a different content. In other words, the position on a recording medium where the content is recorded varies depending on the content.

Therefore, it is highly probable that the address recorded in "VIDEO_TS.IFO" differs from one content to another. In other words, the uniqueness of an ID is secured by reflecting the data subject to conversion and retrieved from "VIDEO_TS.IFO" in the ID. Further, since the address recorded in "VTS_xx_0.IFO" is a detailed address related to the attribute information of the title set, the uniqueness of an ID is more successfully secured by ensuring that the ID reflects the data subject to conversion and retrieved from "VTS_xx_0.IFO". Thus, the ID acquisition unit 30 enhances the uniqueness of an ID by generating an ID such that the ID reflects the addresses of a plurality of attribute information items related to a content.

Further, according to the inventive configuration of the ID acquisition unit 30, different content IDs are generated even when DVD media store similar contents such that a normal edition images of a title and special edition images of the same title are recorded in the respective media. In other words, different content IDs are generated before and after modification to a given image content.

Typically, special edition images result from partly modifying a normal edition image content. The difference between normal edition images and special edition images is reflected in the addresses of the title sets recorded in "VIDEO_TS.IFO" or the addresses of the attribute information recorded in "VTS_xx_0.IFO". When the content is partly modified, the addresses of the title sets that follow the modified title set would differ from the addresses before the modification. The addresses of the attribute information recorded in "VTS_yy_0.IFO" would also differ from those before the modification. For example, when information is added to the content, the address, i.e., the position of recording in the medium would be shifted behind after the modification. Therefore, the ID acquisition unit 30 determines the content ID for the special edition images different from that of the normal edition images.

When a different recording medium such as a CD medium or a BD medium is read instead of a DVD medium, the ID acquisition unit 30 may determine the content ID in accordance with the addresses of the contents. When the identification information for a content is set up in a recording medium from which the content is run, the identification information may be acquired as a content ID.

The ID communication unit 38 communicates the information indicating the type of medium read by the media reader 22 (e.g., CD, DVD, BD, etc.) and the content ID acquired by the ID acquisition unit 30 to the database server 50. The key acquisition unit 40 acquires the content key corresponding to the medium type and the content ID from the database server 50 and stores the key thus acquired in the key storage unit 42.

Upon receipt of a request to acquire the information related to the content, the acquisition request issuing unit 44 transmits a request to acquire the related information to the database server 50, the online shopping site server 70, or the online encyclopedia server 72. The request for acquisition associates the content key stored in the key storage unit 42 with the information for designating the information related to the content subject to acquisition by the acquisition request (hereinafter, also referred to as "acquisition target designation information").

In response to the request for the related information, the related information acquisition unit 46 receives the related information designated by the acquisition target designation information from the database server 50, the online shopping site server 70, or the online encyclopedia server 72 and communicates the information to the content running unit 26. When the content key of another content and the information indicating the destination of transmission of the acquisition request are received instead of the related information as requested, the content key is stored in the key storage unit 42. Thereafter, the acquisition request issuing unit 44 transmits the related information acquisition request including the content key of another content to an external device designated by the transmission destination information. Thereby, the related information acquisition unit 46 acquires the related information as needed.

Figure 3:
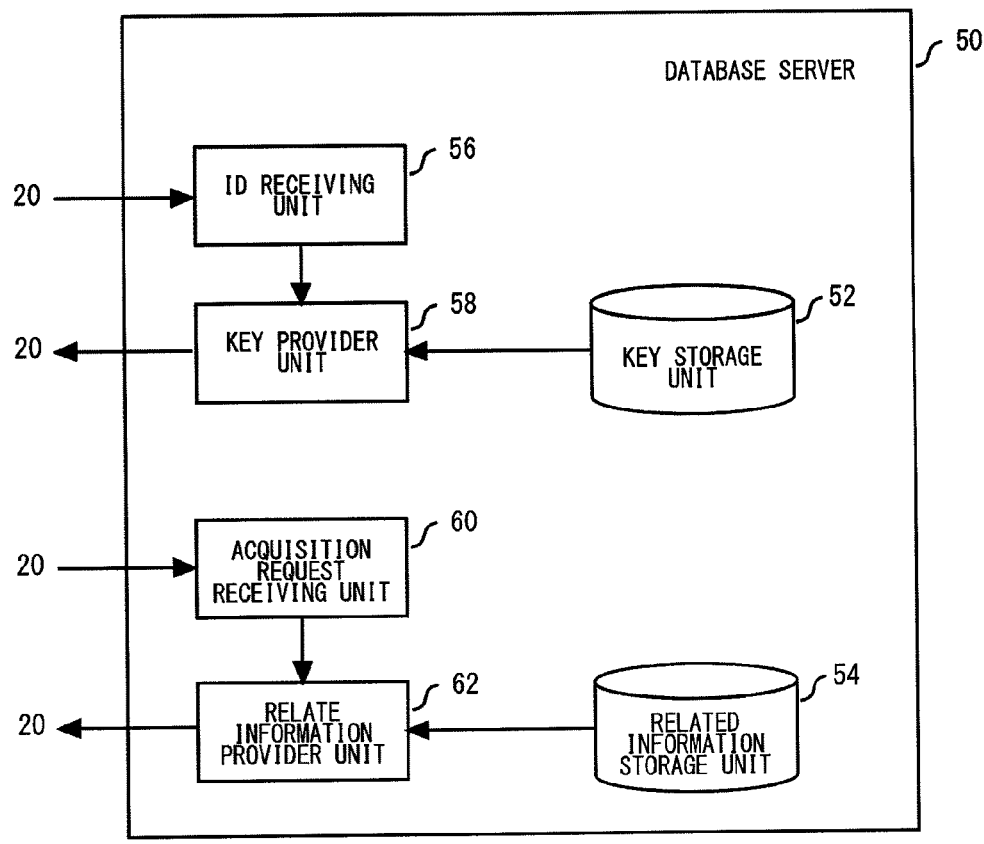
FIG. 3 is a block diagram showing the functional configuration of the database server of FIG. 1.

FIG. 3 is a block diagram showing the functional configuration of the database server 50 of FIG. 1. The database server 50 comprises a key storage unit 52, a related information storage unit 54, an ID receiving unit 56, a key provider unit 58, an acquisition request receiving unit 60, and a related information provider unit 62.

The key storage unit 52 is a storage area that stores a key table mapping the content ID of the content on a recording medium that can be read by the media player 20 into the content key. The key storage unit 52 stores a key table for each type of recording medium (e.g., CD, DVD, or BD). This allows provision of content keys adapted for various recording media that can be run by the media player 20.

Figure 4:
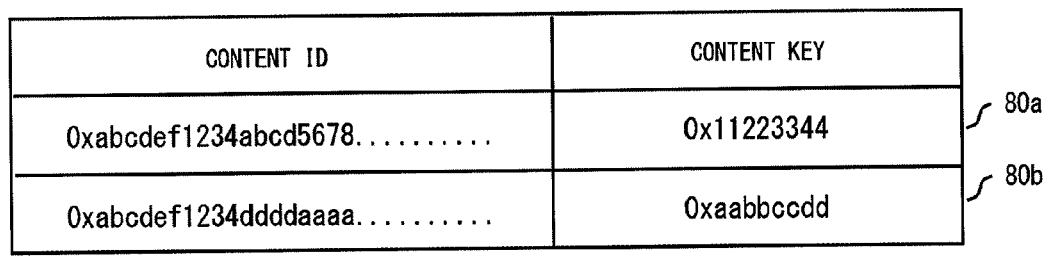
FIG. 4 schematically shows the configuration of a key table.

FIG. 4 schematically shows the configuration of a key table. The key table of FIG. 4 associates 60-byte content IDs with 4-byte content keys. A key record 80a, which is a record related to the first content, and a key record 80b, which is a record related to the second content different from the first content, will be discussed later. Reference is made back to FIG. 3.

The related information storage unit 54 is a storage area that stores a related information table mapping the information related to a content into the content key. FIG. 5 schematically shows the configuration of a related information table. The title information column stores the information on titles included in the content. The chapter information column stores the information on chapters included in each title. The entry "real data" in FIG. 5 indicates that the title information and the chapter information themselves are recorded instead of the content key.

The series product column of FIG. 5 stores the content key of another content in the same series as the content. The recommended product column stores the information related to the content and recorded in the online shopping site server 70, e.g, the content key of another content to be recommended to the user of the content. The performer information column stores the information related to the content and recorded in the online encyclopedia server 72, e.g., the content key of the information on a performer performing in the content. A related information record 82a, which is a record related to the first content, and a related information record 82b, which is a record related to the second content, will be discussed later. Reference is made back to FIG. 3.

The ID receiving unit 56 receives from the media player 20 the information indicating the type of medium read by the media player 20 and the content ID from the medium. The key provider unit 58 refers to the key table corresponding to the medium type thus communicated and transmits the content key corresponding to the content ID thus communicated to the media player 20.

The acquisition request receiving unit 60 receives from the media player 20 a request for acquiring the information related to the content (hereinafter, also referred to as "target content") run by the media player 20. The related information provider unit 62 refers to the related information table and transmits the content related information mapped into the content key and designated by the acquisition target designation information to the media player 20.

A description will now be given of the process performed when the related information designated by the acquisition target designation information is the information related to another content. The term "another content" encompasses a content different from the target content. The term also encompasses the target content itself, for which the real data of the related information is stored in the server other than the database server 50, i.e. the online shopping site server 70 or the online encyclopedia server 72. In this case, the related information provider unit 62 transmits, as the information related to the content, the content key of another content and the information indicating the destination of transmission of the acquisition request (e.g., the host name or the IP address of the database server 50, the online shopping site server 70, or the online encyclopedia server 72) to the media player 20. This allows the media player 20 to issue a request to acquire the related information using the content key of another content to the device that stores the information related to another content.

A description will now be given of the steps performed in the above-described configuration.

Figure 6:
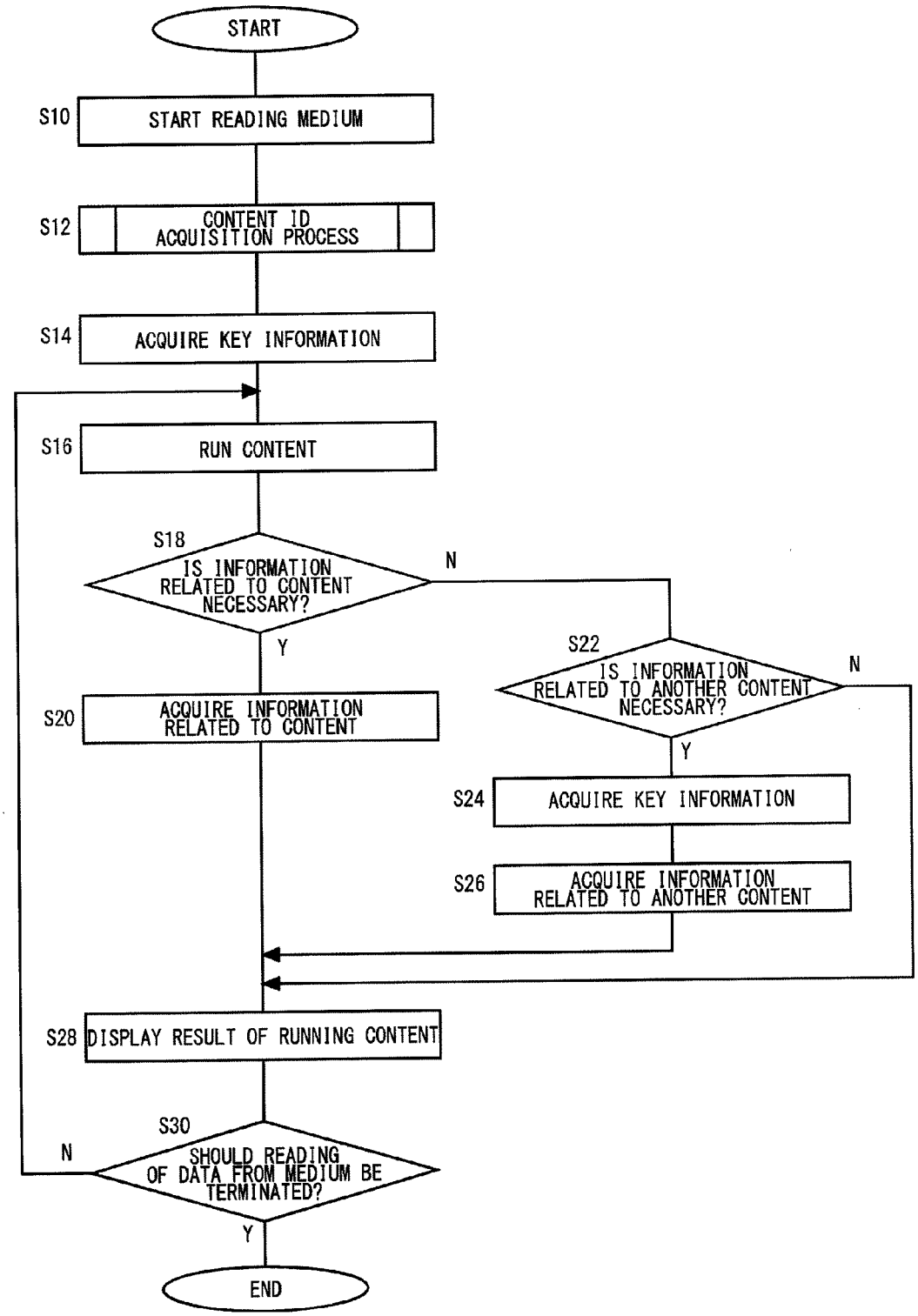
FIG. 6 is a flowchart showing the operation of the media player of FIG. 1.

FIG. 6 is a flowchart showing the operation of the media player 20 of FIG. 1. The media reader 22 reads the recorded data from the DVD medium 10 from which the content is run (S10). The ID acquisition unit 30 performs the content ID acquisition process described later to acquire the content ID from the DVD medium 10 (S12). The ID communication unit 38 transmits the information indicating the type of medium from which the content is run and the content ID to the database server 50. The key acquisition unit 40 receives the content key corresponding to the transmitted content from the database server 50 and stores the key in the key storage unit 42 (S14).

The content running unit 26 runs the content on the DVD medium 10 (the target content) in accordance with the recorded data on the DVD medium 10 as read by the media reader 20 and the user operation detected by the operation detector 24 (S16). When the related information becomes necessary while the content is being run (Y in S18), the acquisition request issuing unit 44 transmits a request to acquire the requested related information to the database server 50, including the content key from the DVD medium 10 in the request. In response to the acquisition request, the related information acquisition unit 46 receives the requested related information from the database server 50 and transmits the information to the content running unit 26 (S20).

When the information related to another content becomes necessary (Y in S22) instead of the information related to the target content (N in S18), the acquisition request issuing unit 44 transmits a request to acquire the requested information related to another content to the database server 50, including the content key from the DVD medium 10 in the request. The related information acquisition unit 46 receives the content key of another content from the database server 50 and stores the key in the key storage unit 42 (S24). Subsequently, the acquisition request issuing unit 44 issues a request to acquire the requested information related to another content to an external device that stores the information related to another content, including the content key of another content in the request. The related information acquisition unit 46 receives the real data for the information related to another content from the external device and transmits the data to the content running unit 26 (S26).

If neither of the information related to the target content nor the information related to another content is necessary (N in S22), S24 and S26 are skipped. The display controller 28 causes the result of running the content by the content running unit 26 on the display 12, including the content related information acquired by the related information acquisition unit 46 in the displayed content (S28). When the reading of data from the DVD medium 10 should be terminated (Y in S30), the illustrated flow is terminated. If the reading should be continued (N in S30), control is returned to S16.

Figure 7:
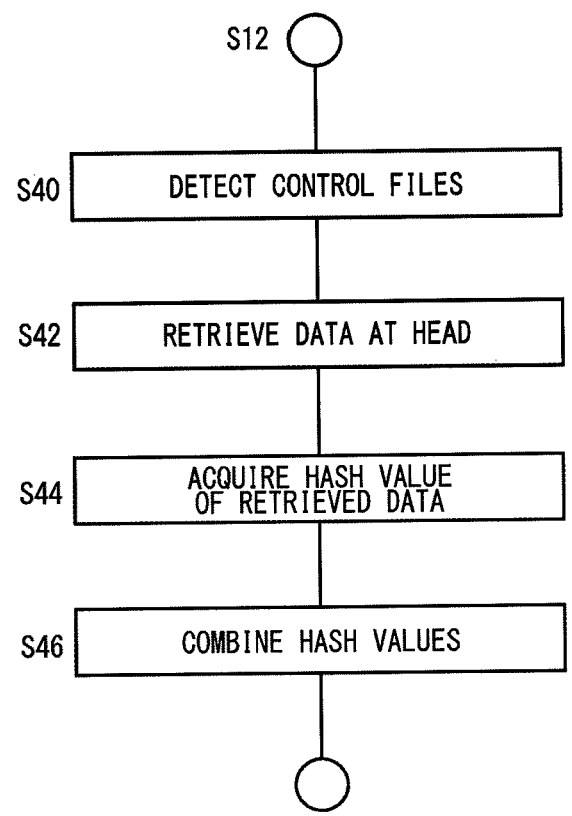
FIG. 7 is a flowchart showing the step S12 of FIG. 6 in detail.

FIG. 7 is a flowchart showing the step S12 of FIG. 6 in detail. The file detector 32 detects three DVD control files from the files recorded in the DVD medium 10, i.e., the IFO file of the video manager, and the IFO files for the first and last title sets (S40). The data retriever 34 retrieves the data subject to conversion, i.e., a predetermined length of data from the head of the file from each of the three DVD control files (S42). The ID determination unit 36 passes the data subject to conversion into the SHA-1 function and acquires Hash values corresponding to the respective data subject to conversion (S44). The ID determination unit 36 determines the data obtained by combining the three Hash values as the content ID (S46).

Figure 8:
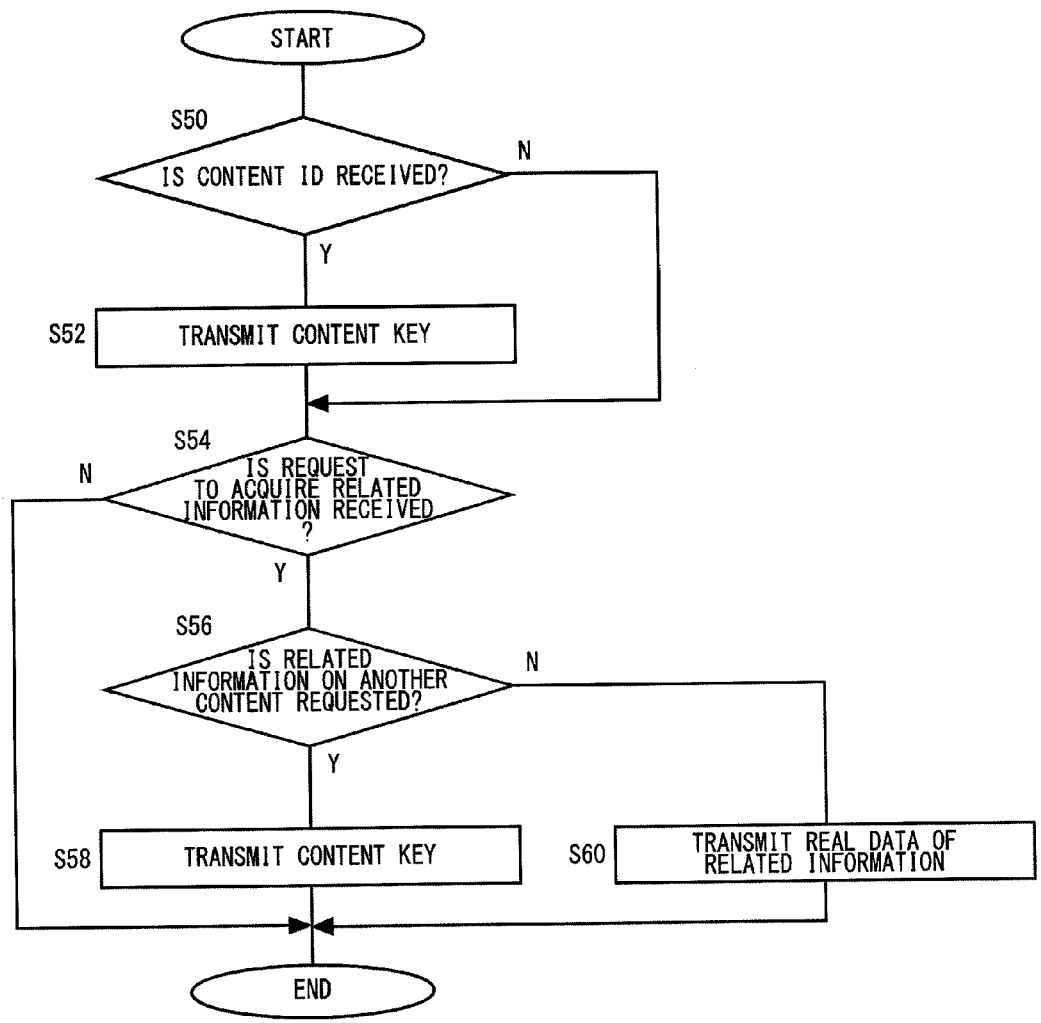
FIG. 8 is a flowchart showing the operation of the database server of FIG. 1.

FIG. 8 is a flowchart showing the operation of the database server 50 of FIG. 1. When the ID receiving unit 56 receives the medium type and the content ID from the media player 20 (Y in S50), the key provider unit 58 refers to the key table corresponding to the medium type and transmits the content key corresponding to the content ID to the media player 20 (S52). When the content ID is not received (N in S50), S52 is skipped.

If the acquisition request receiving unit 60 receives a request to acquire the related information from the media player 20 (Y in S54) and acquisition request designates the information related to another content (Y in S56), the related information provider unit 62 transmits the content key of another content to the media player 20 as the information related to the target content (S58). If the acquisition request designates the information related to the target content (N in S56), the related information provider unit 62 transmits the real data for information related to the target content to the media player 20 (S60). If a request for acquire the related information is not received (N in S54), S56-S60 are skipped.

A further description of the operation of the media player 20 will be given with reference to FIGS. 4 and 5. When running the first content, the media player 20 communicates the content ID of the key record 80*a* to the database server 50 and acquire the content key of the key record 80*a*. If the title information, chapter information, etc. is required to be displayed while the first content is being run, the media player 20 acquires the title information, chapter information, etc. in the related information record 82*a* as the need arises using the content key. If the information on a product belonging to the same series as the first content is becomes necessary, the player 20 temporarily acquires the content key recorded in the series product column of the related information record 82*a* and acquires the data recorded in the related information record 82*b* using the content key.

If a recommended product of the first content becomes necessary, the player 20 temporarily acquires the content key recorded in the recommended product column of the related information record 82*a* and acquires the information on the recommended product from the online site server 70 using the content key. Similarly, when the information on a performer in the first content becomes necessary, the player 20 temporarily acquires the content key stored in the performer information column of the related information record 82*a* and acquires the performer information from the online encyclopedia server 72 using the content key. The timing of acquisition of the content related information may be automatically determined based on the state of running the content in the media player 20 or determined in accordance with an explicit user operation.

The embodiment as described allows the media player 20 to initially acquire only the content key for accessing the information related to the content and to acquire only the related information that becomes necessary while running the content, thereby addressing the overall enormous volume of information related to the content being run. This reduces the amount of resources occupied by the communication network 14 and the media player 20. In other words, the related information not necessary to run the content is not acquired even if the information is related to the content. Therefore, efficient resource usage is achieved.

Further, the media player 20 determines a content ID based on the address information on the content on the recording medium. The number of titles in a recording medium, information on video and audio streams (e.g., codec information, number of streams, language information, etc.) are often identical with different contents. The total playback time and chapter durations may not be identical with different contents but are unlikely to be completely unique. In contrast, a plurality of contents that differ at least in part have different address information as already described. Accordingly, the media player 20 is capable of determining a content ID that can uniquely identify the content.

By determining an ID that can uniquely identify the content, the related information that differs from content to content and that becomes necessary as the content is run can be acquired. The logic for determining an ID is not complicated and can be easily implemented, and an efficient ID determination process is achieved. Further, since a fixed-length content ID is determined by using a Hash function, the data volume needed to store the content ID is defined in advance, facilitating the implementation of the media player 20 and the database server 50.

The database server 50 of the embodiment stores key tables for different types of media from which the content is run by the media player 20. Therefore, the database server 50 can address different types of media that can be read by the media player 20. Further, the related information table maps the related information into the content key of a format adapted for the database server 50 instead of the content ID of a format dependent on the recording medium, efficient storage of the related information and efficient access to the related information are achieved.

The database server 50 stores, as the content related information, the content key of another content, the media player 20 is capable of collecting the related information that becomes necessary as the content is run from various provider devices on the network. The real data for the related information is stored only in the device storing the related information, redundant information management or inconsistency in the information is avoided.

Given above is an explanation of the present invention based on an embodiment. The embodiment is intended to be illustrative only and it will be obvious to those skilled in the art that various modifications to constituting elements and processes could be developed and that such modifications are also within the scope of the present invention.

In the described embodiment, "VTS_xx_0.IFO" is detected to retrieve the data subject to conversion, i.e., "VTS_01_0.IFO" for controlling the first title set and "VTX_yy_0.IFO" for controlling the last title set are detected. In a variation, a DVD control file for controlling another title set may be detected to retrieve the data subject to conversion. The larger the number of files from which to retrieve the data subject to conversion, the more it is ensured that the ID of the DVD medium 10 is unique. In association with this, however, the cost (e.g., time) required to generate an ID is increased. Accordingly, the number of files from which to retrieve the data subject to conversion is desirably determined in consideration of the uniqueness of the ID and the cost required to generate an ID.

The media player 20 may be a dedicated device for processing a recording medium. Alternatively, the player 20 may be any of various information processing devices such as PCs and game devices provided with the function of reading a recording medium. A content key may be an uniform resource identifier (URI) (e.g., uniform resource locator: URL) for identifying an information resource on the network.

It would be understood to a skilled person that the functions to be achieved by the claimed elements are implemented by the elements indicated in the embodiment and the variation, or combinations thereof.

What is claimed is:
1. A media player comprising:
   a data retriever configured to retrieve data from a file recorded on a DVD medium from which content is run and configured to control overall behavior of the DVD medium, and configured to retrieve data from a file for controlling behavior of a video title set recorded on the DVD medium, both sets of data including an address that indicates a position of recording on the DVD medium of attribute information that is related to a unit of content provided on the DVD medium for which the position of recording varies as the unit of content is modified for recording;

an ID determination unit configured to determine an ID for identifying the unit of content provided by the DVD medium in accordance with the data retrieved from the file for controlling the overall behavior of the DVD medium and the data retrieved from the file for controlling the behavior of the video title set, such that, given normal image content and special image content resulting from partly-modified normal image content, the ID determination unit determines an ID for the special image content that is different from the ID for the normal image content; and a related information acquisition unit configured to acquire, from an external device that stores information related to the unit of content provided by the DVD medium, information related to the unit of content provided by the DVD medium and associated with the ID determined by the ID determination unit, by communicating the determined ID to the external device.

2. The media player according to claim 1,
wherein the data retriever retrieves data including addresses of a plurality of items of attribute information related to the content, and
the ID determination unit determines the ID of the content by reflecting in the ID the addresses of the plurality of items of attribute information.

3. The media player according to claim 1,
wherein the ID determining unit determines as the ID a fixed-length Hash value obtained by passing the retrieved data to a predetermined Hash function.

4. The media player according to claim 1,
wherein the data retriever retrieves a predetermined length of data including the address from the head of the file for controlling the overall behavior of the DVD medium and the file for controlling the behavior of the video title set.

5. A content ID determination method executed by a media player, comprising:
retrieving data from a file recorded on a DVD medium from which content is run and configured to control overall behavior of the DVD medium, and configured to retrieve data from a file for controlling behavior of a video title set recorded on the DVD medium, both sets of data including an address that indicates a position of recording on the DVD medium of attribute information that is related to a unit of content provided on the DVD medium for which the position of recording varies as the unit of content is modified for recording; and determining an ID for identifying the unit of content provided by the DVD medium in accordance with the data retrieved from the file for controlling the overall behavior of the DVD medium and the data retrieved from the file for controlling the behavior of the video title set, such that, given normal image content and special image content resulting from partly-modified normal image content, an ID for the special image content that is different from the ID for the normal image content is determined, in order to acquire, from an external device that stores information related to the unit of content provided by the DVD medium, information related to the content provided by the DVD medium and associated with the ID for identifying the unit of content provided by the DVD medium, by communicating the determined ID to the external device on the medium, the information associated with the ID and related to the provided content, by communicating the ID to the external device.

6. A computer program embedded on a non-transitory computer-readable medium executed by a computer processor, the computer program comprising:
a module configured to retrieve data from a file recorded on a DVD medium from which content is run and configured to control overall behavior of the DVD medium, and configured to retrieve data from a file for controlling behavior of a video title set recorded on the DVD medium, both sets of data including an address that indicates a position of recording on the DVD medium of attribute information that is related to a unit of content provided on the DVD medium for which the position of recording varies as the unit of content is modified for recording;

a module configured to determine an ID for identifying the unit of content provided by the DVD medium in accordance with the data retrieved from the file for controlling the overall behavior of the DVD medium and the data retrieved from the file for controlling the behavior of the video title set, such that, given normal image content and special image content resulting from partly-modified normal image content, the ID determination unit determines an ID for the special image content that is different from the ID for the normal image content; and a module configured to acquire, from an external device that stores information related to the unit of content provided by the DVD medium, information related to the unit of content provided by the DVD medium and associated with the ID determined by the ID determination unit, by communicating the determined ID to the external device.

* * * * *